(12) United States Patent
Zhao et al.

(10) Patent No.: US 11,375,236 B2
(45) Date of Patent: Jun. 28, 2022

(54) METHOD AND APPARATUS FOR VIDEO CODING

(71) Applicant: TENCENT AMERICA LLC, Palo Alto, CA (US)

(72) Inventors: Xin Zhao, San Diego, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/865,072

(22) Filed: May 1, 2020

(65) Prior Publication Data

US 2020/0374560 A1 Nov. 26, 2020

Related U.S. Application Data

(60) Provisional application No. 62/851,496, filed on May 22, 2019.

(51) Int. Cl.
*H04N 19/60* (2014.01)
*H04N 19/44* (2014.01)
*H04N 19/70* (2014.01)

(52) U.S. Cl.
CPC ............. *H04N 19/60* (2014.11); *H04N 19/44* (2014.11); *H04N 19/70* (2014.11)

(58) Field of Classification Search
CPC ......... H04N 19/60; H04N 19/44; H04N 19/70
See application file for complete search history.

(56) References Cited

U.S. PATENT DOCUMENTS

| | | | |
|---|---|---|---|
| 2013/0058407 A1* | 3/2013 | Sole Rojals | H04N 19/129 375/240.12 |
| 2019/0166370 A1* | 5/2019 | Xiu | H04N 19/147 |
| 2020/0053360 A1* | 2/2020 | Sole Rojals | H04N 19/60 |
| 2020/0296390 A1* | 9/2020 | Chao | H04N 19/176 |
| 2020/0322607 A1* | 10/2020 | Hsiang | H04N 19/70 |

OTHER PUBLICATIONS

Heiko Schwarz et al. "Non-CE7: Alternative Entropy Coding for Dependent Quantization", Joint Video Experts Team (JVET) of ITU-T SG 16 WP 3 and ISO/IEC JTC 1/SC 29/WG 11, JVET-K0072-v2, 11th Meeting: Ljubljana, SI, Jul. 10-18, 2018 (17 pages).

* cited by examiner

*Primary Examiner* — Tat C Chio
(74) *Attorney, Agent, or Firm* — Arentfox Schiff LLP

(57) ABSTRACT

Aspects of the disclosure provide methods and apparatuses for video encoding/decoding. In some examples, an apparatus for video decoding includes receiving circuitry and processing circuitry. The processing circuitry decodes a first syntax element at coding locations within a transform block for a current block in a first coding pass that scans the coding locations within the transform block, and decodes a second syntax element at the coding locations within the transform block in a second coding pass that is after the first coding pass and scans the coding locations within the transform block. Then, the processing circuitry determines residuals in the transform block based on at least the decoded first syntax element and the decoded second syntax element at the coding locations in the transform block, and reconstructs samples of the current block based on the residuals in the transform block.

20 Claims, 12 Drawing Sheets

```
residual_ts_coding( x0, y0, log2TbWidth, log2TbHeight, cIdx ) {
    log2SbSize = ( Min( log2TbWidth, log2TbHeight ) < 2 ? 1 : 2 )
    numSbCoeff = 1 << ( log2SbSize << 1 )
    lastSubBlock = ( 1 << ( log2TbWidth + log2TbHeight − 2 * log2SbSize ) ) − 1
/* Loop over subblocks from last to the top-left (DC) subblock */
    inferDcSbCbf = 1
    for( i = lastSubBlock; i >= 0; i−− ) {
        xS = DiagScanOrder[ log2TbWidth − log2SbSize ][ log2TbHeight − log2SbSize ][ lastSubBlock ][ 0 ]
        yS = DiagScanOrder[ log2TbWidth − log2SbSize ][ log2TbHeight − log2SbSize ][ lastSubBlock ][ 1 ]
        if( ( i > 0 || !inferDcSbCbf )
            coded_sub_block_flag[ xS ][ yS ]
        if( coded_sub_block_flag[ xS ][ yS ] && i > 0 )
            inferDcSbCbf = 0
        }
    /* First scan pass */
        inferSbDcSigCoeffFlag = 1
        for( n = ( i == numSbCoeff − 1; n >= 0; n−− ) {
            xC = ( xS << log2SbSize ) + DiagScanOrder[ log2SbSize ][ log2SbSize ][ n ][ 0 ]
            yC = ( yS << log2SbSize ) + DiagScanOrder[ log2SbSize ][ log2SbSize ][ n ][ 1 ]
            if( coded_sub_block_flag[ xS ][ yS ] && ( n > 0 || !inferSbDcSigCoeffFlag ) ) {
                sig_coeff_flag[ xC ][ yC ]
                if( sig_coeff_flag[ xC ][ yC ] )
                    inferSbDcSigCoeffFlag = 0
            }
            if( sig_coeff_flag[ xC ][ yC ] ) {
                coeff_sign_flag[ n ]
                abs_level_gtX_flag[ n ][ 0 ]
                if( abs_level_gtX_flag[ n ][ 0 ] )
                    par_level_flag[ n ]
            }
            AbsLevelPassX[ xC ][ yC ] =
                sig_coeff_flag[ xC ][ yC ] + par_level_flag[ n ] + abs_level_gtX_flag[ n ][ 0 ]
        }
```

*FIG. 8A*

*CONTINUE FROM FIG. 8A*

```
/* Greater than X scan passes (numGtXFlags=5) */
        for( i = 1; i <= numGtXFlags - 1 && abs_level_gtX_flag[ n ][ i - 1 ]; i++ ) {
                for( n = numSbCoeff - 1; n >= 0; n-- ) {
                        xC = ( xS << log2SbSize ) + DiagScanOrder[ log2SbSize ][ log2SbSize ][ n ][ 0 ]
                        yC = ( yS << log2SbSize ) + DiagScanOrder[ log2SbSize ][ log2SbSize ][ n ][ 1 ]
                        abs_level_gtX_flag[ n ][ i ]
                        AbsLevelPassX[ xC ][ yC ] + = 2 * abs_level_gtX_flag[ n ][ i ]
                }
        }
    /* remainder scan pass */
        for( n = numSbCoeff - 1; n >= 0; n-- ) {
                xC = ( xS << log2SbSize ) + DiagScanOrder[ log2SbSize ][ log2SbSize ][ n ][ 0 ]
                yC = ( yS << log2SbSize ) + DiagScanOrder[ log2SbSize ][ log2SbSize ][ n ][ 1 ]
                if( abs_level_gtX_flag[ n ][ numGtXFlags - 1 ] )
                        abs_remainder[ n ]
                TransCoeffLevel[ x0 ][ y0 ][ cIdx ][ xC ][ yC ] = ( 1 - 2 * coeff_sign_flag[ n ] ) *
                                                                                                                (
AbsLevelPassX[ xC ][ yC ] + abs_remainder[ n ] )
        }
    }
}
```

FIG. 8B

METHOD AND APPARATUS FOR VIDEO CODING

INCORPORATION BY REFERENCE

This present disclosure claims the benefit of priority to U.S. Provisional Application No. 62/851,496, "TU-LEVEL COEFFICIENT CODING" filed on May 22, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

SUMMARY

Aspects of the disclosure provide methods and apparatuses for video encoding/decoding. In some examples, an apparatus for video decoding includes receiving circuitry and processing circuitry. The processing circuitry decodes a first syntax element at coding locations within a transform block for a current block in a first coding pass that scans the coding locations within the transform block, and decodes a second syntax element at the coding locations within the transform block in a second coding pass that is after the first coding pass and scans the coding locations within the transform block. Then, the processing circuitry determines residuals in the transform block based on at least the decoded first syntax element and the decoded second syntax element at the coding locations in the transform block, and reconstructs samples of the current block based on the residuals in the transform block.

According to an aspect of the disclosure, the processing circuitry decodes a first group of syntax elements including the first syntax element in the first coding pass, and decodes a second group of syntax elements including the second syntax element in the second coding pass. In some embodiments, the processing circuitry decodes each of multiple groups of syntax elements in a respective coding pass that scans the coding locations within the transform block. Each of the multiple groups of syntax elements includes one or more syntax elements.

In some embodiments, each of the multiple groups of syntax elements includes one syntax element.

In an embodiment, the processing circuitry decodes first multiple groups of syntax elements that are defined for a transform skip mode in response to the transform block being coded in the transform skip mode and decodes second multiple groups of syntax elements that are defined for a block based differential pulse-code modulation (BDPCM) mode in response to the transform block being coded in the BDPCM mode.

In another embodiment, the processing circuitry decodes the multiple groups of syntax elements in a first coding pass order in response to the transform block being coded in a transform skip mode, and decodes the multiple groups of syntax elements in a second coding pass order in response to the transform block being coded in a block based differential pulse-code modulation (BDPCM) mode.

In some embodiments, the processing circuitry decodes each of multiple groups of syntax elements in the respective coding pass that scans the coding locations within the transform block in one of diagonal scan order, a zig-zag scan order, a horizontal scan order, and a vertical scan order.

In some examples, the processing circuitry decodes each of multiple groups of syntax elements in a coding pass that scans sub blocks in the transform block and scans coding locations within a sub block in one of diagonal scan order, a zig-zag scan order, a horizontal scan order, and a vertical scan order.

In an example, the processing circuitry uses a counter to determine a remaining budget for context coded bins of syntax elements in the transform block. Further, the processing circuitry decodes a syntax element with a context model in response to an existence of the remaining budget, and decodes a syntax element without using a context model in response to a depletion of the remaining budget.

In some embodiments, the first syntax element has a higher context coding gain than the second syntax element.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIGS. 8A-8B shows a table of a residual coding syntax for transform skip mode used in some examples.

DETAILED DESCRIPTION OF EMBODIMENTS

Figure 1:
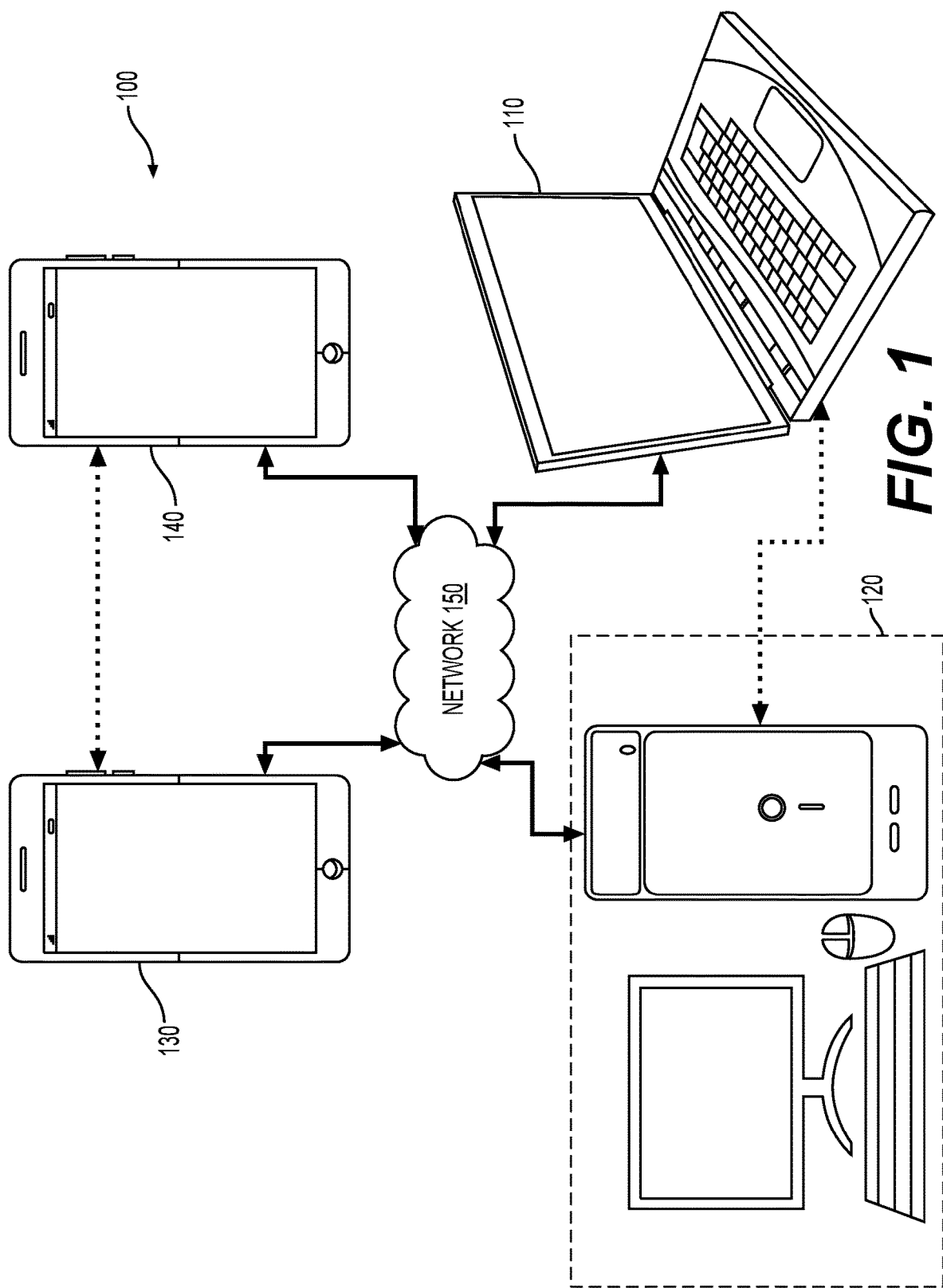
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
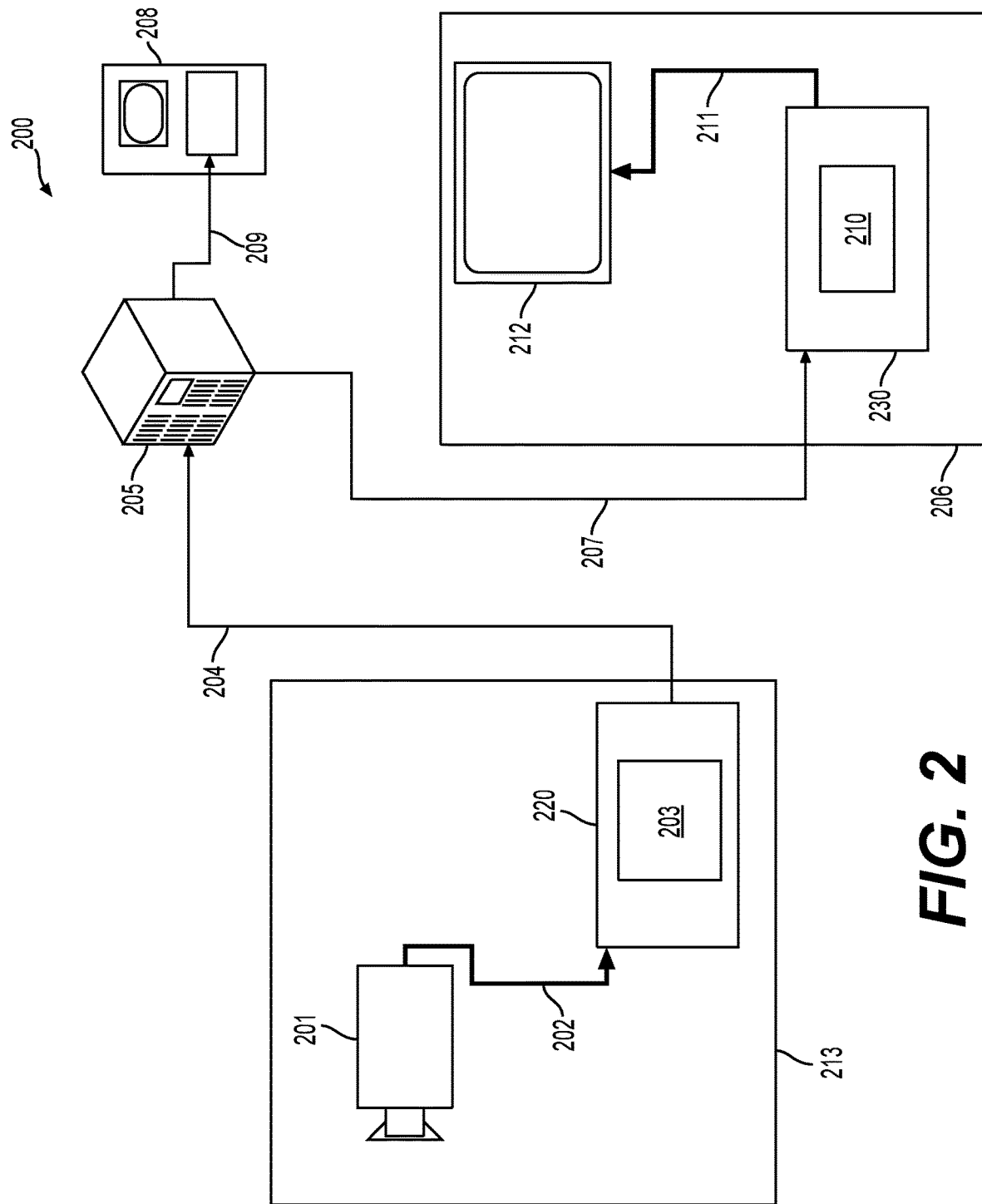
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
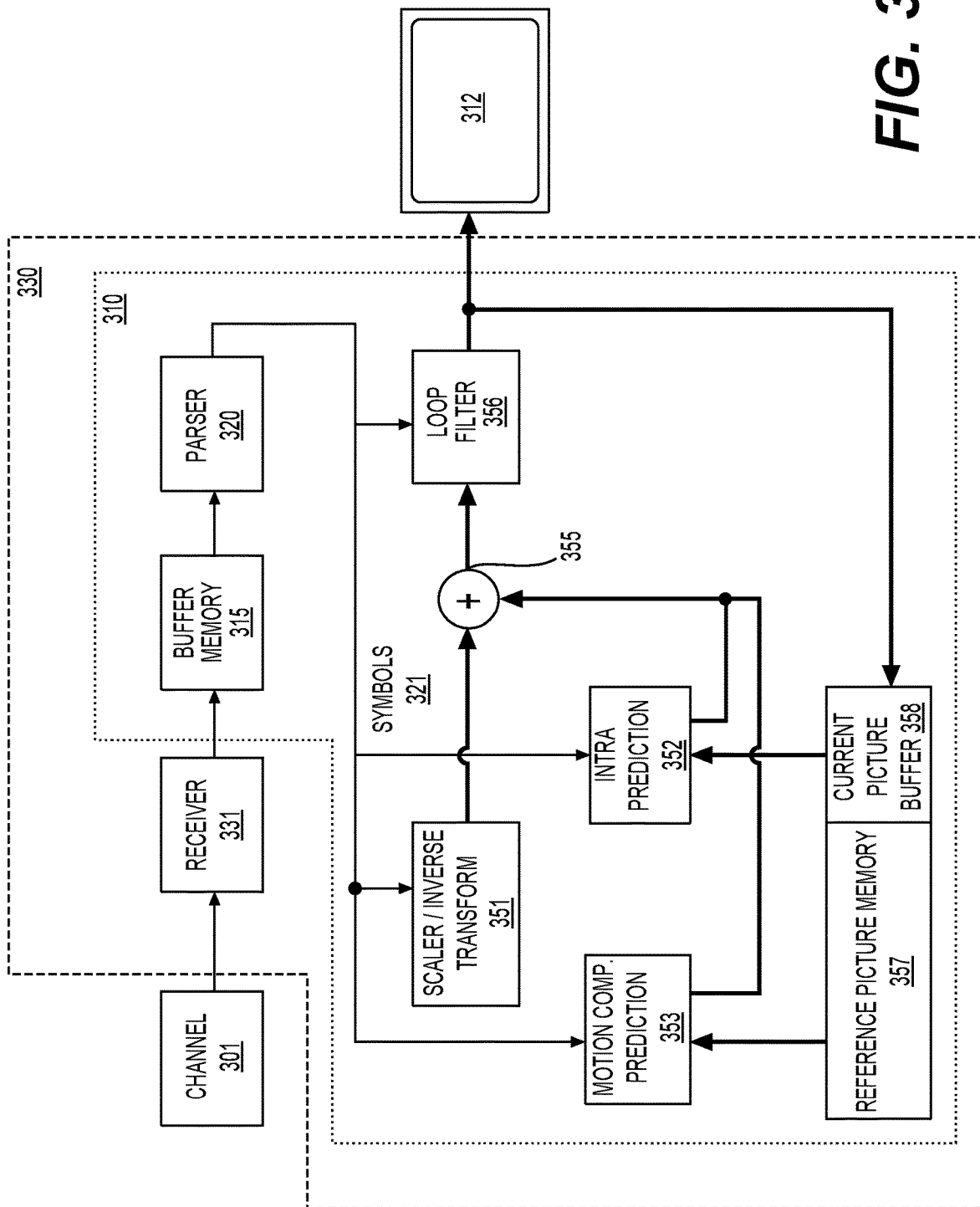
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplemental Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
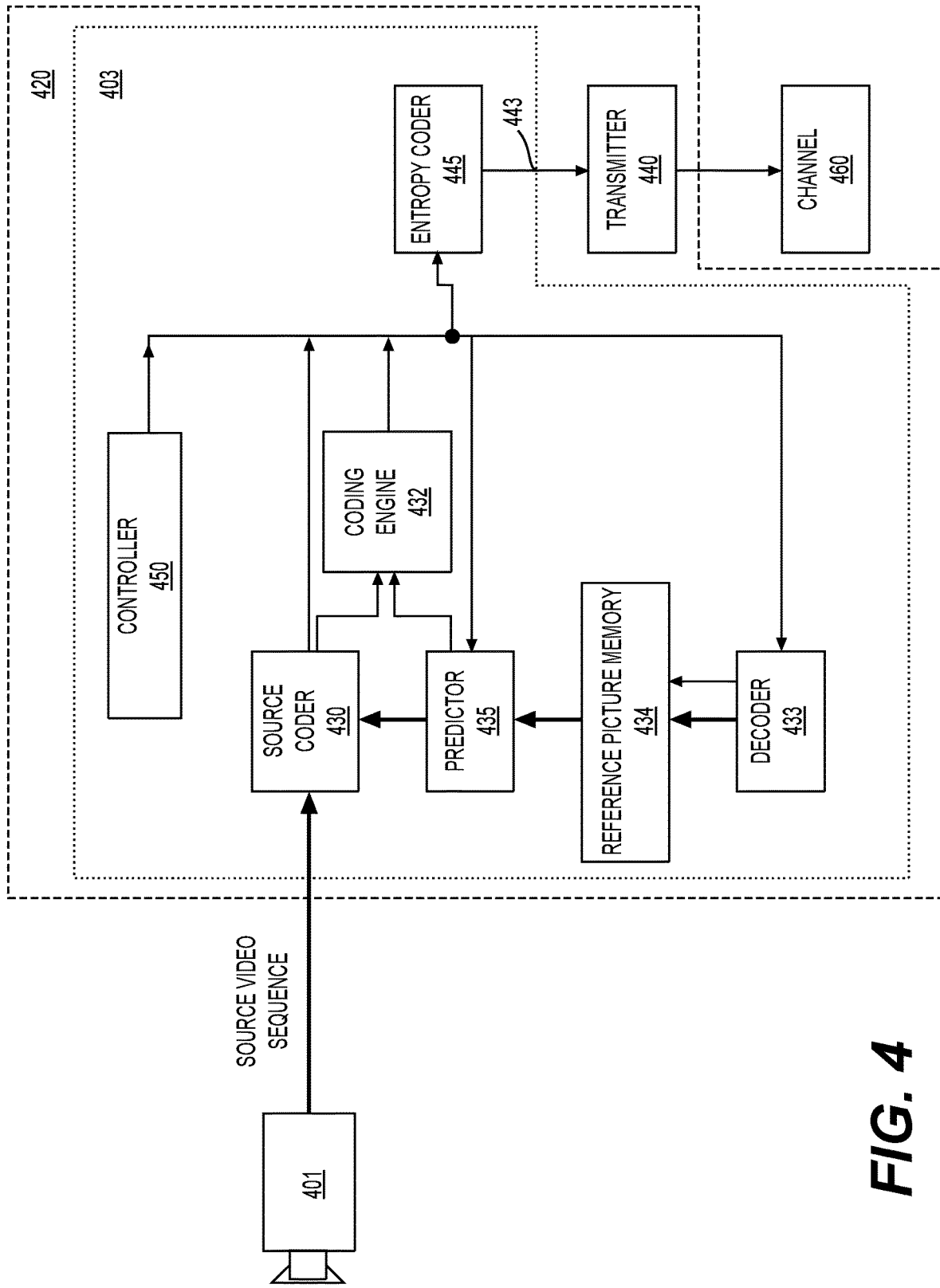
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously coded picture from the video sequence that were designated as "reference pictures." In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by lossless compressing the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
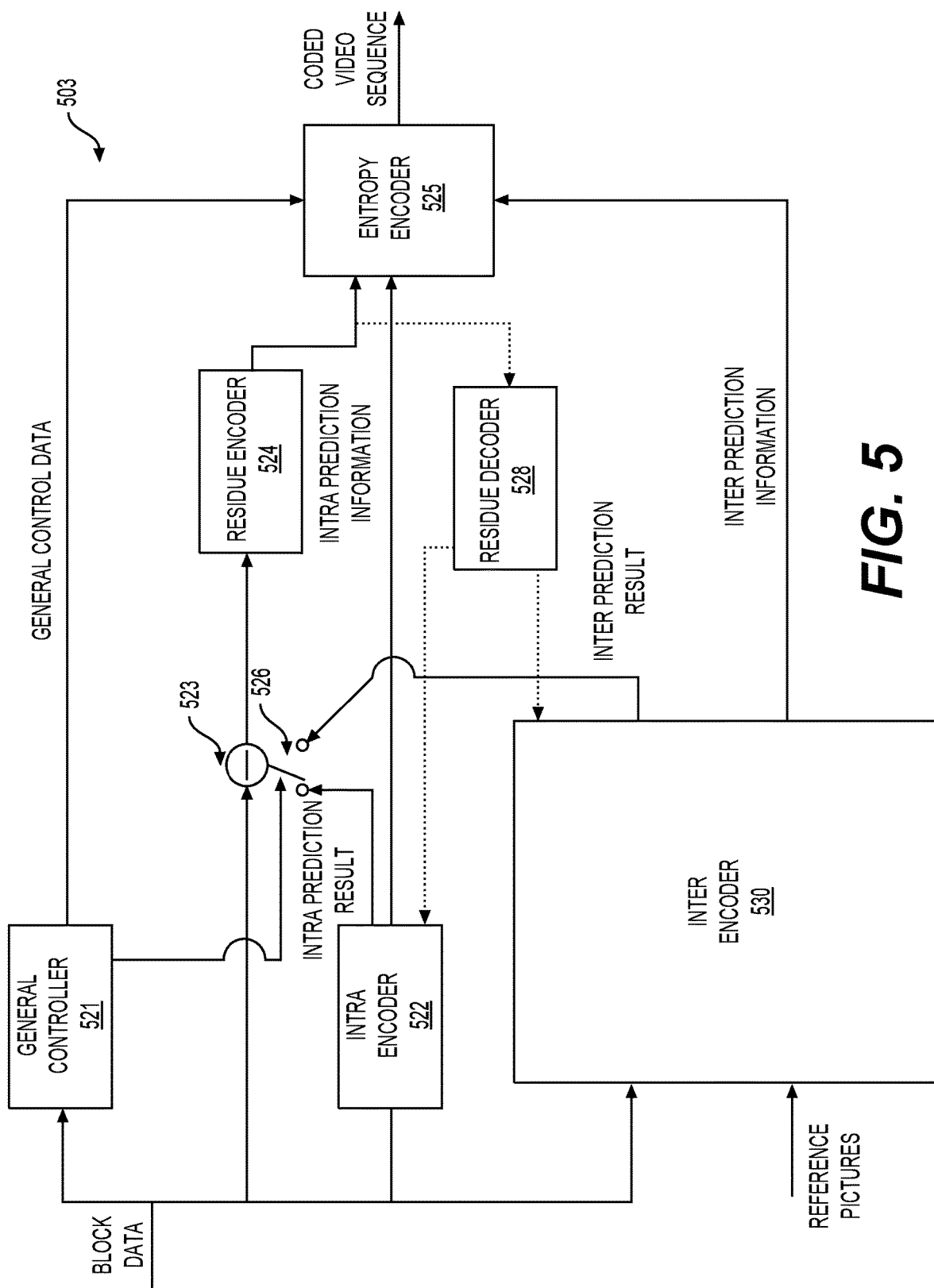
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521), and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra mode, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as the HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
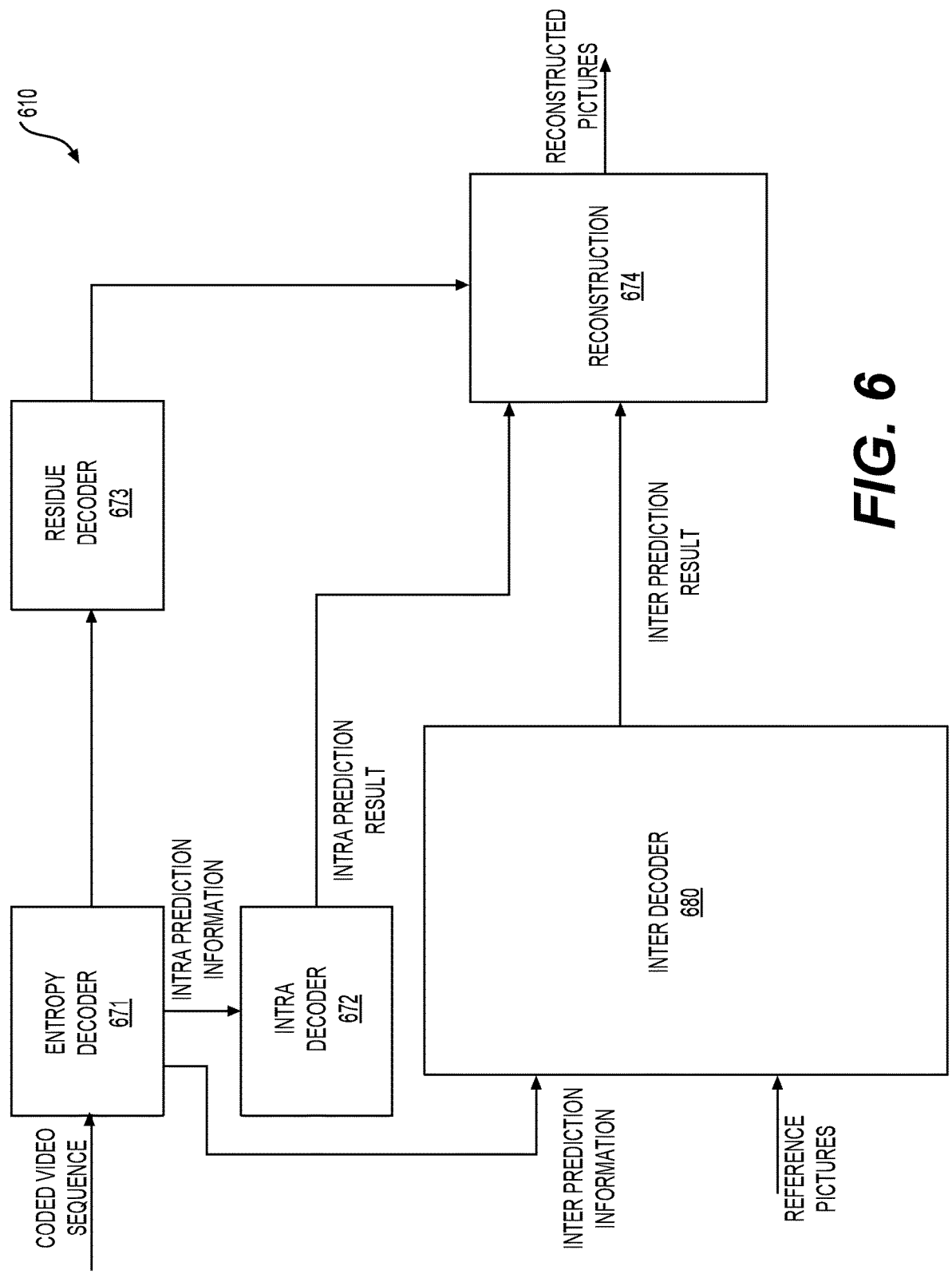
FIG. 6 shows a block diagram of a decoder in accordance with another embodiment.

FIG. 6 shows a diagram of a video decoder (610) according to another embodiment of the disclosure. The video decoder (610) is configured to receive coded pictures that are part of a coded video sequence, and decode the coded pictures to generate reconstructed pictures. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (672) or the inter decoder (680), respectively, residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter (QP)), and that information may be provided by the entropy decoder (671) (data path not depicted as this may be low volume control information only).

The reconstruction module (674) is configured to combine, in the spatial domain, the residual as output by the residue decoder (673) and the prediction results (as output by the inter or intra prediction modules as the case may be)

to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403), and (503), and the video decoders (210), (310), and (610) can be implemented using any suitable technique. In an embodiment, the video encoders (203), (403), and (503), and the video decoders (210), (310), and (610) can be implemented using one or more integrated circuits. In another embodiment, the video encoders (203), (403), and (403), and the video decoders (210), (310), and (610) can be implemented using one or more processors that execute software instructions.

Aspects of the disclosure provide entropy coding techniques for transform coefficients in hybrid video coding technologies. In some embodiments, the entropy coding techniques can change coding order of transform coefficient related syntax elements. Generally, a transform unit (TU) can be split into sub blocks, such as coefficient groups (CGs) that each has a size of 4×4. In some examples, the transform coefficients are coded one coefficient group by one coefficient group (also referred to as CG level). The present disclosure can provide entropy coding techniques that operate coding pass in TU level instead of the CG level.

In some examples, such as VVC, entropy coding techniques for transform coefficients are adopted.

Figure 7:
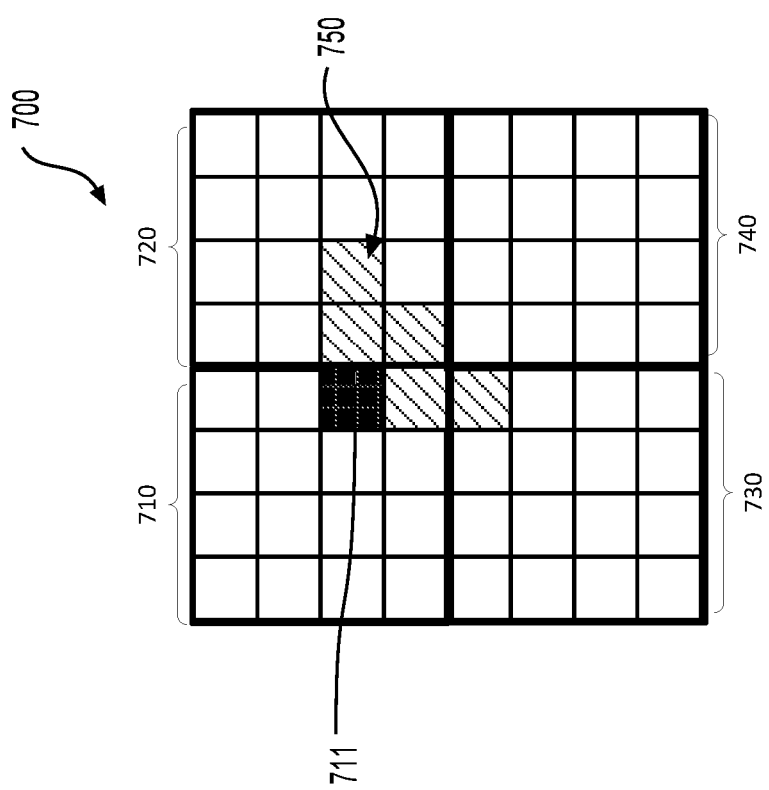
FIG. 7 shows an example of a transform block.

FIG. 7 shows an example of a coding block (700) corresponding to a transform unit. The coding block (700) has a size of 8×8, and is split into sub-blocks (710), (720), (730), and (740). Each of the sub-blocks (710), (720), (730), and (740) has a size of 4×4, and corresponds to a coefficient group. The transform coefficients within each of the sub-blocks (710), (720), (730), and (740) are coded according to predefined scan orders. In an example, the transform coefficients in the sub-block (740) are coded first; then the transform coefficients in the sub-block (730) are coded; then the transform coefficients in the sub-block (720) are coded; and the transform coefficients in the sub-block (710) are coded last.

According to an aspect of the disclosure, for a sub-block (corresponding to a CG) with at least one non-zero transform coefficient, the coding of transform coefficients can be separated into multiple scan passes, such as four passes, and the coding of the transform coefficients using the multiple scan passes. For example, absLevel denotes the absolute value of the current transform coefficient. In a first pass, the syntax elements sig_coeff_flag (which indicates absLevel is larger than 0), par_level_flag (which indicates the parity of absLevel) and rem_abs_gt1_flag (which indicates (absLevel−1)>>1 is greater than 0, which also indicate absLevel is greater than 2) are coded; in a second pass, the syntax element rem_abs_gt2_flag (which indicates absLevel is greater than 4) is coded; in a third pass, the remaining values (referred as abs_remainder) of transform coefficient levels are invoked, if necessary; in a fourth pass, the sign information is coded.

According to another aspect of the disclosure, transform coefficients can be context coded. For example, to exploit the correlation between transform coefficients, the previously coded transform coefficients covered by a local template can be used in the context selection for the current transform coefficient. In the FIG. 7 example, the current transform coefficient (711) is positioned as shown by black in the coding block (700), and a local template (750) for the current transform coefficient (711) covers five neighboring coefficients positioned as shown by slanted lines in the coding block (700). Let absLevel1[x][y] represents the partially reconstructed absolute level for the transform coefficient at position (x, y) after the first pass, d represents the diagonal position of the current coefficient (d=x+y), numSig represents the number of non-zero coefficients in the local template and sumAbs1 represents the sum of partially reconstructed absolute level absLevel1[x][y] for transform coefficients covered by local template (750).

In some examples, when coding sig_coeff_flag of the current coefficient, the context model index is selected depending on sumAbs1 and diagonal position d. More specifically, in an example, for Luma component, the context model index is determined according to:

$$ctxSig = 18 \times \max(0, state-1) + \min(sumAbs\ 1, 5) + (d<2?12:(d<5?6:0)) \qquad (Eq.\ 1)$$

In some examples, the context model index is determined based on a combination of a base (context model index base) and an offset (context model index offset). Then, (Eq. 1) is equivalent to (Eq. 2) and (Eq. 3) in an example:

$$ctxIdBase = 18 \times \max(0, state-1) + (d<2?12:(d<5?6:0)) \qquad (Eq.\ 2)$$

$$ctxSig = ctxIdSigTable[\min(sumAbs\ 1,5)] + ctxIdBase \qquad (Eq.\ 3)$$

For chroma component, the context model index is determined according to (Eq. 4)

$$ctxSig = 12 \times \max(0, state-1) + \min(sumAbs\ 1,5) + (d<2?6:0) \qquad (Eq.\ 4)$$

It is noted that, in an example in terms of a base and an offset, (Eq. 4) is equivalent to (Eq. 5) and (Eq. 6):

$$ctxIdBase = 12 \times \max(0, state-1) + (d<2?6:0) \qquad (Eq.\ 5)$$

$$ctxSig = ctxIdSigTable[\min(sumAbs\ 1,5)] + ctxIdBase \qquad (Eq.\ 6)$$

where state specifies the scalar quantizer used if the dependent quantization is enabled and state is derived using a state transition process; the table ctxIdSigTable stores the context model index offset, ctxIdSigTable[0~5]={0, 1, 2, 3, 4, 5}.

When coding par_level_flag of the current coefficient, the context model index is selected depending on sumAbs1, numSig and diagonal position d. More specifically, in some examples, for luma component, the context model index is determined according to (Eq. 7):

$$ctxPar = 1 + \min(sumAbs\ 1 - numSig, 4) + (d==0?15: (d<3?10:(d<10?5:0))) \qquad (Eq.\ 7)$$

In some examples, in terms of a base and an offset, (Eq. 7) is equivalent to (Eq. 8) and (Eq.9):

$$ctxIdBase = (d==?15:(d<3?10:(d<10?5:0))) \qquad (Eq.\ 8)$$

$$ctxPar = 1 + ctxIdTable[\min(sumAbs\ 1 - numSig, 4)] + ctxIdBase \qquad (Eq.\ 9)$$

For chroma component, the context model index is determined according to (Eq. 10):

$$ctxPar = 1 + \min(sumAbs\ 1 - numSig, 4) + (d==0?5:0) \qquad (Eq.\ 10)$$

In some examples, in terms of a base and an offset, (Eq. 10) is equivalent to (Eq. 11) and (Eq. 12):

$$ctxIdBase = (d==0?5:0) \qquad (Eq.\ 11)$$

$$ctxPar = 1 + ctxIdTable[\min(sumAbs\ 1 - numSig, 4)] + ctxIdBase \qquad (Eq.\ 12)$$

where the table ctxIdTable stores the context model index offset, ctxIdTable[0~4]={0, 1, 2, 3, 4}.

When coding rem_abs_gt1_flag and rem_abs_gt2_flag of the current coefficient, their context model index is determined in a similar way as par_level_flag, for example:

$ctxGt1=ctxPar$ and $ctxGt2=ctxPar$

It is noted that different sets of context models are used for rem_abs_gt1_flag and rem_abs_gt2_flag. This means that the context model used for rem_abs_gt1_flag is different from that of rem_abs_gt2_flag, even though ctxGt1 is equal to ctxGt2.

According to some aspects of the disclosure, entropy coding can also be used for coding residuals in the transform skip mode (TSM) and/or the block based residual differential pulse-code modulation mode (residual domain BDPCM). Certain coding techniques, such as by pass coding, context coding and the like can be used for the coding the residuals in the TSM and the BDPCM. In an example, by pass coding is referred to the technique that directly codes the residuals without using context coding.

In some embodiments, in order to adapt the residual coding to the statistics and signal characteristics of the transform skip mode and BDPCM residual levels, which represent the quantized prediction residual (spatial domain), the coding scheme for transform coefficients described above is modified and applied for TSM and BDPCM modes as described below.

In some embodiments, three coding passes are used in the residual coding for the TSM and BDPCM. In some examples, the coefficients in the TSM and BDPCM modes may correspond to residuals. For example, absLevel is the absolute value of the current residual. In an example, in a first coding pass, sig_coeff_flag (which is used to indicate that absLevel is larger than 0), coeff_sign_flag (which is used to indicate the sign of the residual), abs_level_gt1_flag (which is used to indicate that absLevel is greater than 2), par_level_flag (which is used to indicate the parity of the absLevel) are coded. In the second pass, abs_level_gtX_flag (which is used to indicate that absLevel is greater than $2^X$) are coded, where X can be 3, 5, 7, . . . In the third pass, abs_remainder (which is used to indicate the remainder of the residual level) are coded. The coding passes are operated at the coefficient group (CG) level. For each CG (e.g., 4×4 residuals), three coding passes are performed.

In some embodiments, the entropy coding for the residuals has no coding for last significant (e.g., non zero) scanning position. Specifically, since the residual signal reflects the spatial residual after the prediction and no energy compaction by transform is performed for TSM, the higher probability for trailing zeros or insignificant levels at the bottom right corner of the transform block is not given anymore. Thus, last significant scanning position signaling is omitted in this case. Instead, the first sub-block to be processed is the most bottom right sub-block within the transform block.

In some embodiments, certain signaling techniques for sub-block coded block flags (CBFs) are used. For the absence of the last significant scanning position signaling, the sub-block CBF signaling with coded_sub_block_flag for TSM can be modified based on three considerations.

Based on a first consideration, due to quantization, the aforementioned sequence of insignificance may still occur locally inside a transform block. Thus, the last significant scanning position is removed as described before and coded_sub_block_flag is coded for all sub-blocks.

Based on a second consideration, the coded_sub_block_flag for the sub-block covering the DC frequency position (top-left sub-block) presents a special case. In an example, the coded_sub_block_flag for this sub-block is not signaled and always inferred to be equal to 1. When the last significant scanning position is located in another sub-block, it means that there is at least one significant level outside the DC sub-block. Consequently, the DC sub-block may contain only zero/non-significant levels although the coded_sub_block_flag for this sub-block is inferred to be equal to 1. With the absence of the last scanning position information in TS, the coded_sub_block_flag for each sub-block is signaled. This also includes the coded_sub_block_flag for the DC sub-block except when all other coded_sub_block_flag syntax elements are already equal to 0. In this case, the DC coded_sub_block_flag is inferred to be equal to 1 (inferDcSbCbf=1). Since there has to be at least one significant level in this DC sub-block, the sig_coeff_flag syntax element for the first position at (0,0) is not signaled and derived to be equal to 1 (inferSbDcSigCoeffFlag=1) instead if all other sig_coeff_flag syntax elements in this DC sub-block are equal to 0.

Based on a third consideration, the context modeling for coded_sub_block_flag is changed. The context model index is calculated as the sum of the coded_sub_block_flag to the right and the coded_sub block_flag below the current sub-block instead of and a logical disjunction of both.

According to an aspect of the disclosure, sig_coeff_flag context modelling is used. In an example, the local template in sig_coeff_flag context modeling is modified to only include the neighbor to the right ($NB_0$) of the current scanning position and the neighbor below ($NB_1$) the current scanning position. The context model offset is just the number of significant neighboring positions sig_coeff_flag [$NB_0$]+sig_coeff_flag[$NB_1$]. Hence, the selection of different context sets depending on the diagonal d within the current transform block is removed. This results in three context models and a single context model set for coding the sig_coeff_flag flag.

According to an aspect of the disclosure, abs_level_gt1_flag and par_level_flag context modelling can be performed using a single context model for abs_level_gt1_flag and par_level_flag.

According to an aspect of the disclosure, certain abs_remainder coding techniques are used. Although the empirical distribution of the transform skip residual absolute levels typically still fits a Laplacian or a Geometrical distribution, there exist larger instationarities than for transform coefficient absolute levels. Particularly, the variance within a window of consecutive realization is higher for the residual absolute levels. Accordingly, following two modifications of the abs_remainder syntax binarization and context modelling can be performed.

In a first modification, a higher cutoff value in the binarization is used. For example, increasing the cutoff value for the transition point from the coding with sig_coeff_flag, abs_level_gt1_flag, par_level_flag, and abs_level_gt3_flag to the Rice codes for abs_remainder, and dedicated context models for each bin position can yield higher compression efficiency. Increasing the cutoff can result in more "greater than X" flags, e.g. introducing abs_level_gt5_flag, abs_level_gt7_flag, and so on until a cutoff is reached. In some examples, the cutoff itself is fixed to 5 (numGtFlags=5).

In a second modification, the template for the rice parameter derivation is modified, i.e., only the neighbor to the left and the neighbor below the current scanning position are considered similar to the local template for sig_coeff_flag context modeling.

According to an aspect of the disclosure, coeff_sign_flag context modelling technique is used. Due to the instationarities inside the sequence of signs and the fact that the prediction residual is often biased, the signs can be coded using context models, even when the global empirical distribution is almost uniformly distributed. A single dedicated context model is used for the coding of the signs and the sign is parsed after sig_coeff_flag to keep all context coded bins together.

According to an aspect of the disclosure, restriction technique of context coded bins is used. In some examples, the total number of context coded bins per TU is restricted to be the TU area size multiplied by 2. For example, the maximum number of context coded bins for a 16×8 TU is 16×8×2=256. The budget of context coded bins is consumed at the TU-level, that is, instead of the individual budget of context coded bins per CG, all the CGs inside the current TU share one budget of context coded bins.

FIGS. 8A-8B shows a table of a residual coding syntax for transform skip mode used in some examples. The table of residual coding syntax implements some of the features described above.

According to some aspects of the disclosure, comparing to by-pass coding, context coded bins contribute different coding gains for different syntax elements. In an example, context coded bins contribute more coding gain for sig_coeff_flag than abs_level_gtX_flag. However, in some examples, since the total budget of context coded bins is specified for the current TU but the coding passes are performed at CG level, thus some of the sig_coeff_flag in later coded CGs of the current TU may have no chance to be context coded because all syntax elements in preceding CGs consumed all the budget of context coded bins, which may be not optimal in terms of coding performance.

Aspects of the disclosure provide entropy coding techniques of transform coefficients and residual coding of TSM, and residual coding of BDPCM mode. The entropy coding techniques can prioritize syntax elements with higher context coding gains for context coding at the TU level, and use the context coding budget in an optimal manner to improve coding efficiency.

According to an aspect of the disclosure, entropy code the transform coefficient related syntax elements is performed using a TU-level coding pass scheme. Specifically, in some examples, all the syntax elements are first separated into different groups, namely group of syntax elements (GSE). Then, a coding order of different groups of syntax elements are defined. Further, following the given coding order, GSE is coded at TU-level and one GSE by one GSE. For example, after all the syntax elements inside the current GSE are coded for the current TU, the entropy coding for the next GSE can start. The entropy coding of transform coefficient finishes when all GSE are coded. Meanwhile, the total number of context coded bins for the current TU is restricted to be a pre-defined number.

In some examples, syntax elements are grouped and ordered to prioritize certain syntax elements with higher context coding gains. Thus, when the total number of context coded bins for the current TU is budgeted of a pre-defined number, the certain syntax elements with the higher context coding gains have more chances to be context coded in TU level coding passes than in the CG level coding passes.

According to an aspect of the disclosure, various techniques can be used to define the groups of syntax elements (GSEs).

In an embodiment, each GSE includes only one syntax element.

In another embodiment, a GSE may include an individual or a combination of the following syntax elements: sig_coeff_flag, coeff_sign_flag, abs_level_gt1_flag, par_level_flag, abs_level_gtX_flag where X is 3, 5, 7, . . . and abs_remainder.

In some examples, a first GSE includes sig_coeff_flag; a second GSE includes abs_level_gt1_flag; a third GSE includes coeff_sign_flag; a fourth GSE includes abs_level_gtX_flag; a fifth GSE includes par_level_flag; and a sixth GSE includes abs_remainder. In example, the GSEs can be coded at the TU level coding passes in an order of the first GSE, the second GSE, the third GSE, the fourth GSE, the fifth GSE and the sixth GSE. In another example, the GSEs can be coded at the TU level coding passes in an order of the first GSE, the third GSE, the second GSE, the fourth GSE, the fifth GSE and the sixth GSE.

In some examples, a first GSE includes sig_coeff_flag; a second GSE includes abs_level_gt1_flag; a third GSE includes par_level_flag; a fourth GSE includes abs_level_gtX_flag; a fifth GSE includes coeff_sign_flag; and a sixth GSE includes abs_remainder. In example, the GSEs can be coded at the TU level coding passes in an order of the first GSE, the second GSE, the third GSE, the fourth GSE, the fifth GSE and the sixth GSE. In another example, the GSEs can be coded at the TU level coding passes in an order of the first GSE, the second GSE, the fourth GSE, the third GSE, the fifth GSE and the sixth GSE.

In some examples, a first GSE includes sig_coeff_flag; a second GSE includes abs_level_gt1_flag; a third GSE includes abs_level_gtX_flag; a fourth GSE includes par_level_flag; a fifth GSE includes abs_remainder; and a sixth GSE includes coeff_sign_flag. In an example, the GSEs can be coded at the TU level coding passes in an order of the first GSE, the second GSE, the third GSE, the fourth GSE, the fifth GSE and the sixth GSE. In another example, the GSEs can be coded at the TU level coding passes in an order of the first GSE, the third GSE, the second GSE, the fourth GSE, the fifth GSE and the sixth GSE.

In some examples, a first GSE includes sig_coeff_flag; a second GSE includes abs_level_gt1_flag; a third GSE includes par_level_flag; a fourth GSE includes abs_level_gtX_flag; a fifth GSE includes abs_remainder; and a sixth GSE includes coeff_sign_flag. In example, the GSEs can be coded at the TU level coding passes in an order of the first GSE, the second GSE, the third GSE, the fourth GSE, the fifth GSE and the sixth GSE. In another example, the GSEs can be coded at the TU level coding passes in an order of the first GSE, the second GSE, the fourth GSE, the third GSE, the fifth GSE and the sixth GSE.

In an embodiment, the GSE may be defined differently in different modes. In an example, a first set of GSEs (one or more GSEs) is defined for the residual coding of TSM mode and a second set of GSEs (one or more GSEs) is defined for the residual coding to non TSM modes. The first set of GSEs is defined differently from the second set of GSEs.

In another example, a first set of GSEs (one or more GSEs) is defined for the residual coding of BDPCM and a second set of GSEs (one or more GSEs) is defined for the residual coding to non BDPCM modes. The first set of GSEs is defined differently from the second set of GSEs.

In another example, a first set of GSEs (one or more GSEs) is defined for the residual coding of TSM and BDPCM a second set of GSEs (one or more GSEs) is defined for the residual coding to non TSM and non BDPCM modes. The first set of GSEs is defined differently from the second set of GSEs.

In another embodiment, the coding order of GSEs may be different for different modes. In an example, a plurality of GSEs is defined for the residual coding of TSM and non TSM modes. The coding order of the GSEs for the TSM mode is different from the coding order of the GSEs for non TSM modes.

In an example, a plurality of GSEs is defined for the residual coding of BDPCM and non BDPCM modes. The coding order of the GSEs for the BDPCM mode is different from the coding order of the GSEs for non BDPCM modes.

In an example, a plurality of GSEs is defined for the residual coding of TSM, BDPCM, non TSM and non BDPCM modes. The coding order of the GSEs for the TM and BDPCM modes is different from the coding order of the GSEs for non TSM and non BDPCM modes.

In an embodiment, the entropy coding of each GSE may be performed using a pre-defined scanning order, such as diagonal scan, zig-zag scan, horizontal scan, vertical scan, and the like. Further, different GSEs may use different scanning order.

In some examples, the entropy coding of a specific GSE may be performed CG by CG, and within each CG, the related syntax elements inside the specific GSE are coded using a pre-defined CG-level scanning order, such as, diagonal scan, zig-zag scan, horizontal scan, vertical scan and the like.

Figure 9:
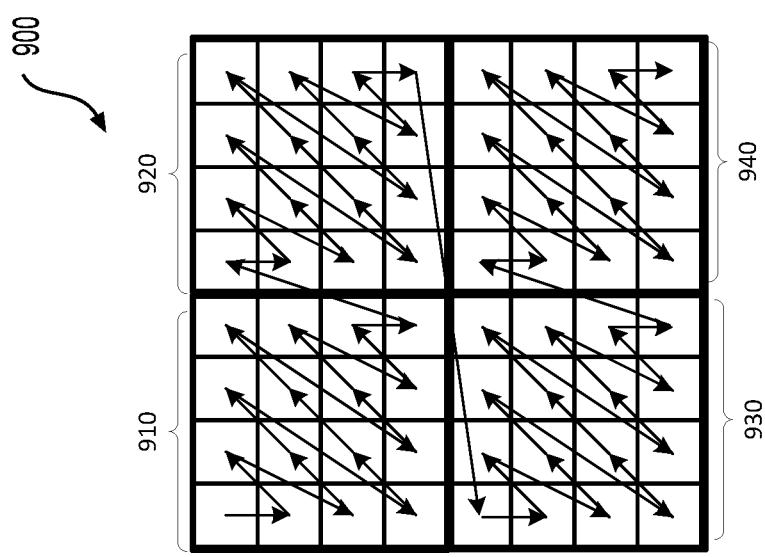
FIG. 9 shows an example of a scanning order in a coding pass according to some embodiments of the disclosure.

FIG. 9 shows an example of a scanning order in a coding pass for coding a GSE of an 8×8 TU (900). The scanning order is a raster scan of CGs, and within each CG, the coefficients (residuals) are scanned using diagonal scan order. Specifically, the TU (900) is split into CGs (910), (920), (930), and (940). The GSE is coded in a raster scan order of CGs following (910), (920), (930), and (940). Within each of the CGs (910), (920), (930), and (940), GSE is coded using diagonal scan order. The scanning order is shown by arrows in FIG. 9.

According to an aspect of the disclosure, the restriction of total number of context coded bins is defined for the current TU. When this number is reached at a certain bin in a certain GSE, all the sub-sequent bins and all the bins of the sub-sequent GSEs are coded using by pass coding.

Figure 10:
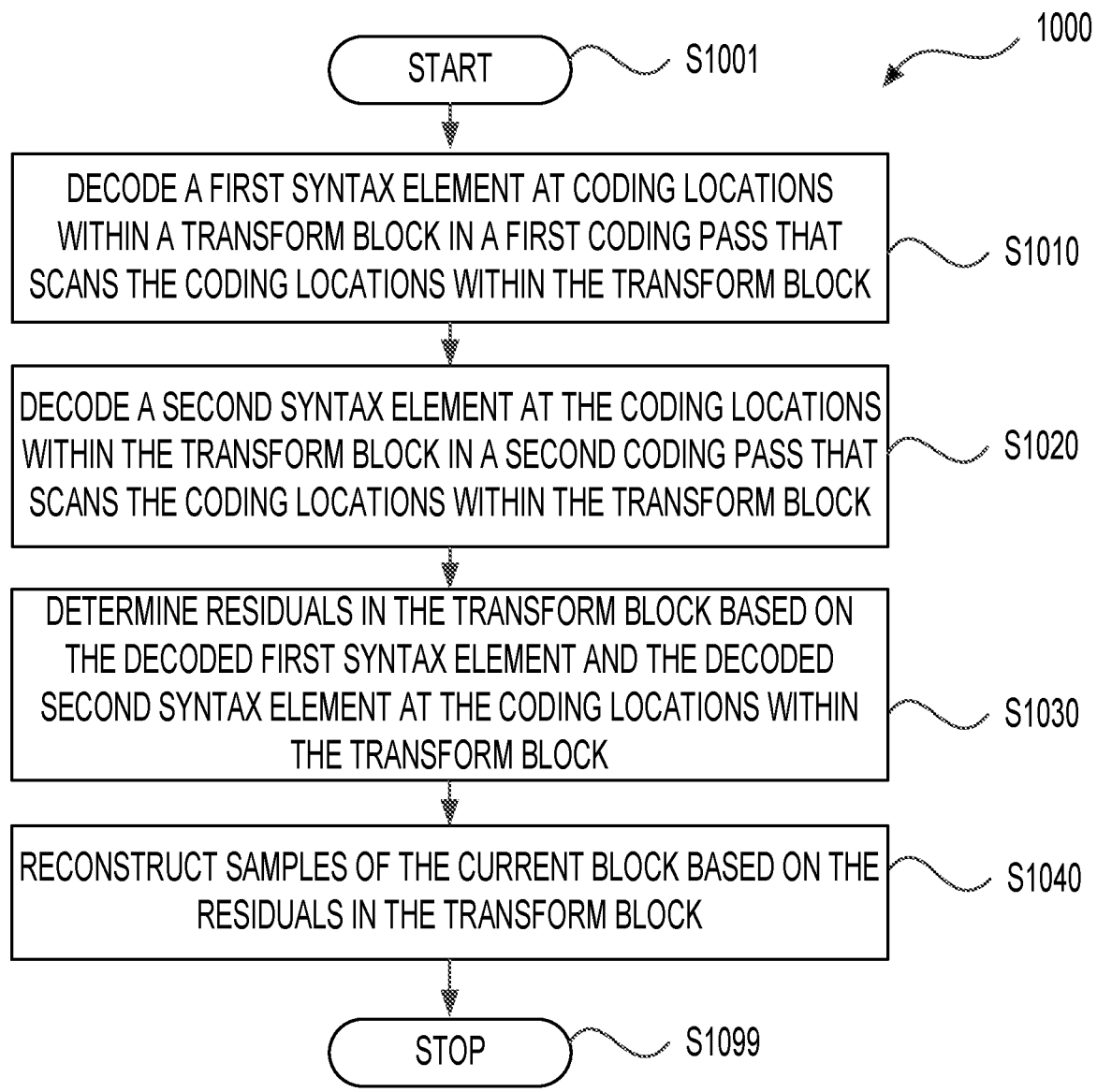
FIG. 10 shows a flow chart outlining a process example according to some embodiments of the disclosure.

FIG. 10 shows a flow chart outlining a process (1000) according to an embodiment of the disclosure. The process (1000) can be used in the reconstruction of a block, so to generate a prediction block for the block under reconstruction. In various embodiments, the process (1000) are executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the video encoder (403), and the like. In some embodiments, the process (1000) is implemented in software instructions, thus when the processing circuitry executes the software instructions, the processing circuitry performs the process (1000). The process starts at (S1001) and proceeds to (S1010).

At (S1010), a first syntax element at coding locations within a transform block of a current block is decoded in a first coding pass that scans the coding locations within the transform block. For example, the first coding pass scans the coding locations in one of a diagonal scan order, a zig zag scan order, a horizontal scan order, a vertical scan order and the like.

At (S1020), a second syntax element at the coding locations within the transform block is decoded in a second coding pass that scans the coding locations within the transform block. For example, the second coding pass scans the coding locations in one of a diagonal scan order, a zig zag scan order, a horizontal scan order, a vertical scan order and the like.

In some embodiments, the first syntax element can achieve a higher coding gain when context coded than the second syntax element. In some examples, each transform block is provided with a budget for context coded bins. In an example, the first syntax element is prioritized at the transform block level, thus the first syntax elements at all the coding locations in the transform block are coded before any of the second syntax elements, and higher coding gain can be achieved under a restricted budget for the context coded bins. In some embodiments, a counter is reset to a number that is the restricted number of context coded bins (also referred to as budget for the context coded bits in the transform block level). The counter can count down in response to each decoded bit for the syntax elements until depletion. Before the budget is depleted, syntax elements can be decoded based on context models; and when the budget is depleted, syntax elements can be decoded based on by pass coding.

According to some aspects of the disclosure, syntax elements for transform coefficients or residuals can be separated into groups of syntax elements, and the groups of syntax elements are coded at the transform block level (also referred to as TU level) in a coding order. The coding order can be defined based on context coding gains in an example. In some examples, after all the syntax elements inside one group of syntax elements are coded for the current TU, the entropy coding for the next group of syntax elements starts.

It is noted that any suitable coding order can be used.

In some embodiments, the groups of syntax elements can be defined differently for different modes. For example, first groups of syntax elements for transform skip mode are defined differently from second groups of syntax elements for BDPCM mode.

In some embodiments, the coding orders of the groups of syntax elements can be different for different modes. For example, the same groups of syntax elements are defined for the transform skip mode and the BDPCM mode. However, in the transform skip mode, the groups of syntax elements are coded in a different order from in the BDPCM mode.

Various scan orders, such as a diagonal scan order, a zig zag scan order, a horizontal scan order, a vertical scan order and the like can be used to scan the coding locations in a transform block. In an example, the transform block is divided into sub blocks, such as 4x4 sub blocks that are also referred to as coefficient groups, and then the scan order scans the sub blocks one by one. In each sub block, the scan order can be any of the diagonal scan order, the zig zag scan order, the horizontal scan order, or the vertical scan order.

At (S1030), residuals in the transform block are determined based on the decoded first syntax element and the decoded second syntax element at the coding locations within the transform block.

At (S1040), samples of the current block are reconstructed based on the residuals in the transform block. Then the process proceeds to S1099 and terminates.

The techniques described above, can be implemented as computer software using computer-readable instructions and physically stored in one or more computer-readable media. For example, FIG. 11 shows a computer system (1100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
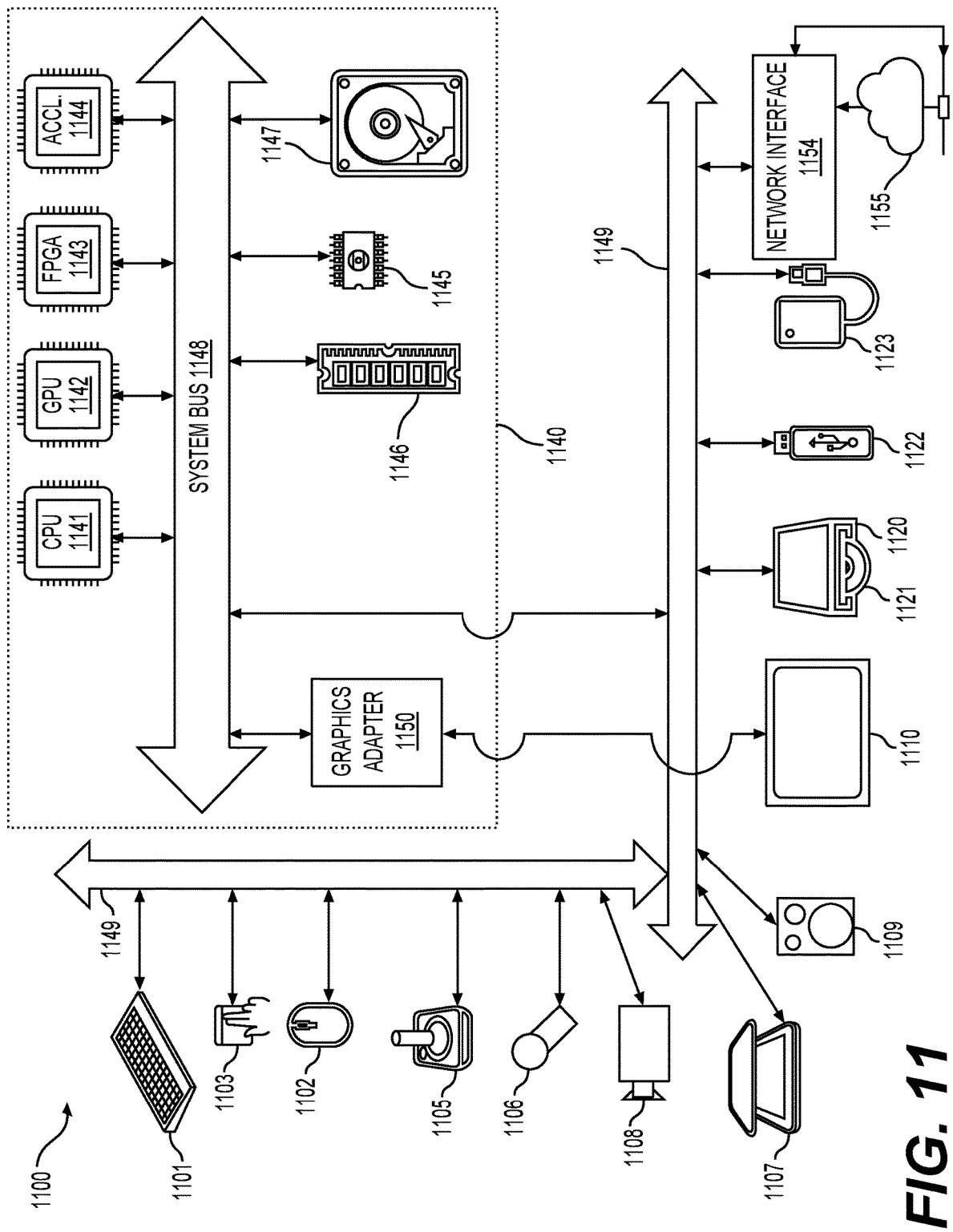
FIG. 11 is a schematic illustration of a computer system in accordance with an embodiment.

The components shown in FIG. 11 for computer system (1100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1100).

Computer system (1100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch screen (1110), data-glove (not shown), joystick (1105), microphone (1106), scanner (1107), camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as screens (1110) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1100) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1149) (such as, for example USB ports of the computer system (1100)); others are commonly integrated into the core of the computer system (1100) by attachment to a system bus as described below (for example Ethernet interface into a PC computer system or cellular network interface into a smartphone computer system). Using any of these networks, computer system (1100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1142), specialized programmable processing units in the form of Field Programmable Gate Areas (FPGA) (1143), hardware accelerators for certain tasks (1144), and so forth. These devices, along with Read-only memory (ROM) (1145), Random-access memory (1146), internal mass storage such as internal non-user accessible hard drives, SSDs, and the like (1147), may be connected through a system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). Architectures for a peripheral bus include PCI, USB, and the like.

CPUs (1141), GPUs (1142), FPGAs (1143), and accelerators (1144) can execute certain instructions that, in combination, can make up the aforementioned computer code. That computer code can be stored in ROM (1145) or RAM (1146). Transitional data can be also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1100), and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various embodiments of the present disclosure can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hard-wired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
TUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
TSM: Transform Skip Mode
IBC: Intra Block Copy
DPCM: Differential pulse-code modulation
BDPCM: Block based DPCM While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
   decoding, by a processor, a first group of syntax elements at coding locations within a transform block for a current block in a first coding pass that scans, at a transform unit level, the coding locations within the transform block, the first group of syntax elements being prioritized in accordance with a coding gain of each syntax element in the first group of syntax elements;
   decoding, by the processor, a second syntax element at the coding locations within the transform block in a second coding pass that is after the first coding pass and scans, at the transform unit level, the coding locations within the transform block;
   determining, by the processor, residuals in the transform block based on at least the decoded first group of syntax elements and the decoded second syntax element at the coding locations in the transform block; and
   reconstructing, by the processor, samples of the current block based on the residuals in the transform block.

2. The method of claim 1, further comprising:
   decoding, by the processor, a second group of syntax elements including the second syntax element in the second coding pass.

3. The method of claim 2, further comprising:
   decoding, by the processor, each of multiple groups of syntax elements in a respective coding pass that scans the coding locations within the transform block, each of the multiple groups of syntax elements including one or more syntax elements.

4. The method of claim 3, wherein each of the multiple groups of syntax elements includes one syntax element.

5. The method of claim 3, further comprising:
   decoding, by the processor, first multiple groups of syntax elements that are defined for a transform skip mode in response to the transform block being coded in the transform skip mode; and
   decoding, by the processor, second multiple groups of syntax elements that are defined for a block based differential pulse-code modulation (BDPCM) mode in response to the transform block being coded in the BDPCM mode.

6. The method of claim 3, further comprising:
   decoding, by the processor, the multiple groups of syntax elements including the first group of syntax elements in the first coding pass in response to the transform block being coded in a transform skip mode; and decoding, by the processor, the multiple groups of syntax elements including the second group of syntax elements in the second coding pass in response to the transform block being coded in a block based differential pulse-code modulation (BDPCM) mode.

7. The method of claim 3, further comprising:
decoding, by the processor, each of the multiple groups of syntax elements in the respective coding pass that scans the coding locations within the transform block in one of diagonal scan order, a zig-zag scan order, a horizontal scan order, and a vertical scan order.

8. The method of claim 3, further comprising:
decoding, by the processor, each of the multiple groups of syntax elements in a coding pass that scans sub blocks in the transform block and scans coding locations within a sub block in one of diagonal scan order, a zig-zag scan order, a horizontal scan order, and a vertical scan order.

9. The method of claim 3, further comprising:
using a counter to determine a remaining budget for context coded bins of syntax elements in the transform block;
decoding a syntax element with a context model in response to an existence of the remaining budget; and
decoding a syntax element without using a context model in response to a depletion of the remaining budget.

10. The method of claim 1, wherein the first group of syntax elements comprises one or more of sig_coeff_flag, coeff_sign_flag, par_level_flag, abs_level_gt1_flag, abs_level_gt3_flag, abs_level_gt5_flag, abs_level_gt7_flag, abs_remainder.

11. An apparatus for video decoding, comprising:
processing circuitry configured to:
decode a first group of syntax elements at coding locations within a transform block for a current block in a first coding pass that scans, at a transform unit level, the coding locations within the transform block, the first group of syntax elements being prioritized in accordance with a coding gain of each syntax element in the first group of syntax elements;
decode a second syntax element at the coding locations within the transform block in a second coding pass that is after the first coding pass and scans, at the transform unit level, the coding locations within the transform block;
determine residuals in the transform block based on at least the decoded first group of syntax elements and the decoded second syntax element at the coding locations in the transform block; and
reconstruct samples of the current block based on the residuals in the transform block.

12. The apparatus of claim 11, wherein the processing circuitry is further configured to:
decode a second group of syntax elements including the second syntax element in the second coding pass.

13. The apparatus of claim 12, wherein the processing circuitry is further configured to:
decode each of multiple groups of syntax elements in a respective coding pass that scans the coding locations within the transform block, each of the multiple groups of syntax elements including one or more syntax elements.

14. The apparatus of claim 13, wherein each of the multiple groups of syntax elements includes one syntax element.

15. The apparatus of claim 13, wherein the processing circuitry is further configured to:
decode first multiple groups of syntax elements that are defined for a transform skip mode in response to the transform block being coded in the transform skip mode; and
decode second multiple groups of syntax elements that are defined for a block based differential pulse-code modulation (BDPCM) mode in response to the transform block being coded in the BDPCM mode.

16. The apparatus of claim 13, wherein the processing circuitry is further configured to:
decode the multiple groups of syntax elements including the first group of syntax elements in the first coding pass in response to the transform block being coded in a transform skip mode; and
decode the multiple groups of syntax elements including the second group of syntax elements in the second coding pass in response to the transform block being coded in a block based differential pulse-code modulation (BDPCM) mode.

17. The apparatus of claim 13, wherein the processing circuitry is further configured to:
decode each of the multiple groups of syntax elements in the respective coding pass that scans the coding locations within the transform block in one of diagonal scan order, a zig-zag scan order, a horizontal scan order, and a vertical scan order.

18. The apparatus of claim 13, wherein the processing circuitry is further configured to:
decode each of the multiple groups of syntax elements in a coding pass that scans sub blocks in the transform block and scans coding locations within a sub block in one of diagonal scan order, a zig-zag scan order, a horizontal scan order, and a vertical scan order.

19. The apparatus of claim 13, wherein the processing circuitry is further configured to:
use a counter to determine a remaining budget for context coded bins of syntax elements in the transform block;
decode a syntax element with a context model in response to an existence of the remaining budget; and
decode a syntax element without using a context model in response to a depletion of the remaining budget.

20. The apparatus of claim 11, wherein the first group of syntax elements comprises one or more of sig_coeff_flag, coeff_sign_flag, par_level_flag, abs_level_gt1_flag, abs_level_gt3_flag, abs_level_gt5_flag, abs_level_gt7_flag, abs_remainder.

* * * * *